2,799,708
PRODUCTION OF HIGHER KETONES FROM SATURATED EPOXIDES

Howard T. Oakley, Elizabeth, and Erving Arundale, Westfield, N. J., and Jennings H. Jones, State College, Pa., assignors to Esso Research and Engineering Company, a corporation of Delaware No Drawing. Application June 10, 1954,
Serial No. 435,926

14 Claims. (Cl. 260—593)

The present invention relates to the preparation of ketones by the catalytic rearrangement of certain cyclic ethers or epoxides. More particularly it relates to the production of ketones containing four or more carbon atoms by the isomerization of cyclic ethers containing at least four carbon atoms in the presence of specific metal catalysts on an activated carbon support.

Various ketones such as methyl n-propyl ketone, methyl n-butyl ketone, ethyl n-propyl ketone, cyclohexanone and the like have been increasing in use as chemical intermediates and industrial solvents. Methyl propyl ketone in particular is of importance as a dewaxing solvent for high boiling petroleum fractions such as those boiling in the lubricating oil range. Methyl butyl and ethyl propyl ketones are medium and high boiling solvents for synthetic resins, gums, waxes, nitrocellulose, ethyl cellulose, fats and oils which find application in the manufacture of lacquers and other surface coatings. Cyclohexanone is employed as a solvent and intermediate in the preparation of certain synthetic fibers. To date the supply of such ketones at economical prices has been rather limited and this has prevented their widespread use.

It is the main object of this invention to provide a simple, effective, yet economical process for preparing various higher molecular weight ketones. A more specific object is to provide a process for making such ketones as the major products in the isomerization of certain cyclic ethers or epoxides.

Basically, the present invention involves passing a saturated epoxide such as 2-methyl tetrahydrofuran, 2,5-dimethyl tetrahydrofuran (also known as 2,5-epoxyhexane), 3,4-epoxyhexane, 1,2-epoxycyclohexane and the like at an elevated temperature and under moderate pressure over a catalyst capable of causing isomerization of the cyclic ether without causing extensive dehydration or decomposition of the feed or product ketone.

The cyclic ethers or epoxides employed as feeds to this process must have the oxygen linked to at least one secondary carbon atom and contain at least 5 and up to 16 carbon atoms per molecule. As an exception to the foregoing generalization, the 4 carbon atom 2,3-epoxybutane is also operative. However, epoxides containing from 5 to not more than 10 carbon atoms are particularly preferred since more extensive substitution, especially where branched alkyl substituents are involved, may appreciably hinder the reaction due to steric effects. The useful epoxides may be represented by the structural formula

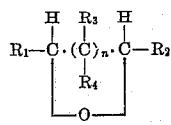

wherein the number of carbon atoms totals from 5 to 16, preferably 5 to 10; $R_1$ is an alkyl group of 1 to 4 carbon atoms; $R_2$ is also preferably an alkyl group of 1 to 4 carbon atoms, but alternatively may be a hydrogen atom; or $R_1$ and $R_2$ are joined together forming a single polymethylene bridge of 3 to 4 carbon atoms; $R_3$ and $R_4$ are hydrogen atoms or alkyl groups of 1 to 4 carbon atoms; and $n$ is an integer ranging from 0 to 3 so that the epoxide nucleus is either an ethylene oxide, propylene oxide, tetramethylene oxide, tetrahydrofurane or tetrahydropyrane, preferably one of the latter two. When $R_1$ and $R_2$ are tied together in a polymethylene bridge they form a naphthene ring as in 1,2-epoxycyclohexane having the formula

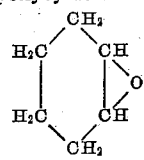

Epoxides suitable for the purposes of this invention are obtained in good yields from the vapor phase noncatalytic oxidation of certain hydrocarbons. A convenient process for carrying out such oxidations is described, for example, in copending application Serial No. 309,144, filed on September 11, 1952, by M. R. Fenske and J. H. Jones, and now U. S. Patent 2,725,344. For instance, normal pentane can be oxidized to 2-methyl tetrahydrofuran and 2,4-epoxypentane; cyclohexane gives 1,2-epoxycyclohexane and some 1,4-epoxycyclohexane; normal heptane gives a mixture of 2-methyl-5-ethyl tetrahydrofuran, 2-propyl tetrahydrofuran, 2,4-epoxy-heptane and 3,4-epoxy-heptane; and normal hexane gives 2,5-dimethyl tetrahydrofuran, 2,4-epoxyhexane and 3,4-epoxyhexane. Suitable epoxides are also obtainable by hydrogenation of the corresponding furan derivatives which in turn can be obtained by the chemical conversion of certain agricultural products. Thus, 2,5-dimethyl tetrahydrofuran is readily formed by hydrogenation of 2,5-dimethylfuran. Epoxides can also be obtained from olefins via chlorohydrin or oxidation reactions.

Other examples of useful compounds include 2-propyl tetrahydrofuran, 2,3,4,5-tetramethyl tetrahydrofuran, 2-propyl-5-n-butyl tetrahydrofuran, 2,3,4-tripropyl tetrahydrofuran, 2-methyl tetrahydropyran, 2,6-diethyl tetrahydropyran, 2-methyl-3,4,6-tripropyl tetrahydropyran, 1,3-epoxypentane, 1,2-epoxypentane, 2,3-epoxyhexane and so forth. Epoxides having less than five carbon atoms do not give ketones, with the exception of 2,3-epoxybutane which can be converted to 2-butanone with the aid of the present invention. On the other hand, 1,2-epoxybutane and 1,4-epoxybutane (tetrahydrofuran) tend to produce an aldehyde rather than a ketone.

The preferred catalysts of this invention are metals of groups I-B and VIII of the periodic table supported on an activated carbon base. These elements include copper, silver, gold, iron, cobalt, nickel, palladium, platinum and the like. Activated carbon is the preferred support since, under similar conditions, other conventional catalyst bases such as alumina, silica, etc., produce dehydration of the feed epoxides or degradation reactions of the desired ketones. Alternatively, such oxide supports bring about conversions of the cyclic ethers to compounds other than ketones, e. g. to aldehydes.

The preferred catalysts are prepared by impregnating activated carbon having a surface area of about 100 to 1500 m.²/g. with an aqueous solution of the metal salt, usually the chloride or nitrate. Sufficient aqueous solution is used to completely wet the carbon base. The resulting paste can then be dried at room temperature and finally at a temperature up to 150° C. in an inert atmosphere. It is finally reduced with hydrogen at a temperature of about 400 to 450° C. prior to use in order to deposit the catalytic metal on the base.

Metal concentrations on the carbon base between 0.01 to 20 percent can be employed. Concentrations in the range of 1.0–10% are preferred, the level depending on the type of metallic component and on the reaction conditions. Such catalysts can be employed in a fixed bed or fluid solids type reactor.

Reactor temperatures may range between about 200 and 500° C., depending to some extent on the nature of the epoxide feed, the space velocity, and the particular catalyst used. In general, for each epoxide there is a readily determinable optimum isomerization temperature, above which the yield of desired carbonyl compounds drops off rather rapidly. Below 250° C., low conversions are obtained and for this reason temperatures in the range of about 300 to 430° C. are preferred. Epoxides of cyclic paraffins tend to require somewhat lower temperatures than epoxides of straight chain paraffins of the same molecular weight.

The reaction is normally conducted at atmospheric pressure, but moderate superpressures up to 100 p. s. i. g. may be used. Space velocities from 0.1 to 2.5 volumes of liquid feed per volume of catalyst per hour can be employed depending on the reaction temperature. Velocities in the range of 0.1–1.2 are preferred at temperatures of 300 to 430° C.

The invention will be further illustrated by the following specific examples. Unless otherwise indicated, all percentages and proportions of materials are expressed throughout on a weight basis.

EXAMPLE I

A 1% platinum on activated carbon catalyst was prepared as follows:

459 grams of activated carbon (8–14 mesh) having a specific surface area of 680 m.$^2$/g. were impregnated with a solution made by dissolving 11.5 grams of chloroplatinic acid in 726 ml. of distilled water. The catalyst was dried 16 hours at room temperature, 16 hours at 120° C. and finally reduced with gaseous hydrogen at 450° C. until evolution of hydrogen chloride had ceased.

2,5-dimethyl tetrahydrofuran (boiling point 91.6° C.), which can be prepared by the non-catalytic oxidation of normal hexane, was passed over the aforementioned catalyst at about 300° C., atmospheric pressure, and at a space velocity of 0.75 liquid volumes of feed per volume of catalyst per hour. The product from the reactor was condensed and then carefully fractionated whereby the following components were isolated.

|  | Percent Conversion | Percent Selectivity |
|---|---|---|
| Hexanone-2 (Methyl n-butyl ketone) | 20.5 | 71.6 |
| 2,5-Dimethyl furan | 3.7 | 13.2 |
| Higher boiling products | 3.3 | 11.7 |
| Water | 1.0 | 3.5 |
| Non-condensable gas | Trace | |
| Unconverted dimethyl tetrahydrofuran | 71.5 | |
|  | 100 | 100 |

It is seen that the major reaction product is methyl n-butyl ketone (boiling point 127° C.) which is produced at a high selectivity and is readily separated from the unconverted feed and by-products by conventional distillation.

EXAMPLE II

Various catalysts containing elements of group I–B and VIII of the periodic table on activated carbon and other supports were prepared in the following general manner.

A solution containing the desired quantity of metal was prepared by dissolving the stoichiometric amount of a salt, usually the chloride, in distilled water. The activated carbon was impregnated with this solution and then dried for about 16 hours at 120° C. The dry catalyst was then reduced with gaseous hydrogen at 400–450° C. until the evolution of hydrogen chloride was no longer detectable by bubbling the off-gas through aqueous ammonium hydroxide solution.

In single experiments, these catalysts were placed in an electrically heated reactor and 2,5-dimethyl tetrahydrofuran was passed over them at atmospheric pressure and at several temperatures and space velocities. The products were characterized and the yield of liquid product, conversion and selectivity to hexanone-2 determined. The results are given in Table I. The liquid product yield, conversion, selectivity to ketone and ketone yield as reported in this and subsequent tables are calculated as follows.

$$\text{Liquid product, vol. percent} = \frac{\text{vol. liquid recovered}}{\text{vol. liquid feed}} \times 100$$

$$\text{Conversion percent} = \frac{\text{vol. feed} - \text{vol. feed recovered}}{\text{vol. feed}} \times 100$$

Selectivity percent to ketone =

$$\frac{\text{vol. keytone recovered}}{\text{vol. feed converted}} \times 100$$

Yield of ketone percent (based on feed) =

$$\frac{\text{percent conversion} \times \text{percent selectivity}}{100}$$

Table I.—*Isomerization of 2,5-dimethyl tetrahydrofuran to hexanone-2 using various catalysts*

| Catalyst | Temp., ° C. | Space Vel., v./v./hr. | Liquid Product, Vol. Percent | Conversion, Percent | Selectivity to Hexanone-2, Percent | Ketone Yields, Percent on Feed |
|---|---|---|---|---|---|---|
| 1% Pt on Act. C | 315 | 0.20 | 91 | 71 | 85 | 60 |
| 20% Pt on Act. C | 315 | 0.20 | 100 | 100 | 89 | 89 |
|  | 430 | 0.19 | 64 | 100 | 42 | 42 |
| 2% Pd on Act. C | 315 | 0.19 | 100 | 40 | 100 | 40 |
|  | 400 | 0.19 | 100 | 96 | 83 | 80 |
| 1% Au on Act. C | 370 | 0.19 | 100 | 60 | 73 | 44 |
|  | 260 | 0.44 | 73 | 30 | 10 | 3 |
| 10% Ag on Act. C | 305 | 0.28 | 100 | 12 | 100 | 12 |
|  | 355 | 0.18 | 64 | 76 | 47 | 36 |
|  | 315 | 0.16 | 100 | 14 | 100 | 14 |
| 10% Co on Act. C | 395 | 0.26 | 100 | 76 | 100 | 76 |
|  | 480 | 0.21 | 58 | 100 | 45 | 45 |
|  | 315 | 0.22 | 100 | 23 | 100 | 23 |
| 5% Ni on Act. C | 370 | 0.21 | 100 | 41 | 73 | 30 |
|  | 430 | 0.25 | 90 | 94 | 46 | 43 |
| 5% Fe on Act. C | 315 | 0.24 | 100 | 12 | 33 | 4 |
|  | 370 | 0.21 | 100 | 91 | 28 | 25 |
| 5% Cu on Act. C | 315 | 0.22 | 100 | 21 | 100 | 21 |
|  | 400 | 0.24 | 89 | 96 | 83 | 80 |
|  | 315 | 0.21 | 100 | 0 |  |  |
| 5% Cu on Pumice | 400 | 0.25 | 100 | 0 |  |  |
|  | 480 | 0.26 | 100 | 4 |  |  |
| 94% ZnO-6% Na$_2$CO$_3$ on Coke | 370 | 0.24 | 100 | 0 |  |  |
|  | 430 | 0.21 | 100 | 2 |  |  |
| Dowex 50 Ion Exchange Resin* | 205 | 0.20 | 100 | 0 |  |  |
|  | 315 | 0.25 | 100 | 2 |  |  |

*Sulfonated polystyrene resin cross-linked by copolymerization with minor amount of divinyl benzene.

It will be noted that catalysts containing between 1 and 20% of platinum, palladium, gold, silver, cobalt, nickel, iron and copper on activated carbon can be employed effectively at temperatures of about 250 to 500° C. to give high conversions and selectivities to the desired ketone. It will also be noted that catalysts containing such metal components on alternate supports such as pumice are inactive for ketone synthesis. Moreover, acid type catalysts such as Dowex 50 and catalysts which are normally used for converting secondary alcohols to ketones, such as 94% ZnO+6% Na2CO3 on coke, are likewise ineffective in this reaction.

EXAMPLE III

A series of catalysts were prepared in the following general manner, which catalysts contained varying amounts of copper on activated carbon.

*Preparation of 5% copper on activated carbon catalyst.*—52 grams of copper chloride (CuCl2.2H2O) were dissolved in 300 ml. of distilled water. 100 grams of activated carbon (8–14 mesh) were soaked in this solution for 16 hours, the carbon then filtered off on a perforated porcelain filter, and the catalyst was dried for 16 hours at 120° C. The dry catalyst was reduced with gaseous hydrogen at 400–450° C. until the evolution of hydrogen chloride could not be detected with aqueous ammonium hydroxide.

These catalysts were then studied for the conversion of 2,5 - dimethyl tetrahydrofuran to hexanone-2. The data are given in Table II.

Table II.—*Isomerization of 2,5 - dimethyl tetrahydrofuran to hexanone-2*

[Effect of copper content on activated carbon]

| Percent Copper on Pittsburgh BP Activated Carbon | Temp. ° C. | Space Velocity, v./v./hr. | Liquid Product, Vol. Percent | Conversion, Percent | Selectivity to Hexanone-2, Percent | Ketone Yield, Percent on Feed |
|---|---|---|---|---|---|---|
| 0 | 260 | 0.16 | 63 | 47 | 16 | 8 |
| 1% | 315 | 0.21 | 100 | 13 | 100 | 13 |
| 2% | 320 | 0.30 | 100 | 21 | 100 | 21 |
| 5% | 315 | 0.22 | 100 | 21 | 100 | 21 |
| 10% | 290 | 0.25 | 100 | 11 | 100 | 11 |
| 0 | 370 | 0.13 | 100 | 84 | 17 | 15 |
| 1% | 410 | 0.24 | 85 | 95 | 68 | 65 |
| 2% | 390 | 0.16 | 100 | 89 | 83 | 74 |
| 5% | 400 | 0.24 | 89 | 96 | 83 | 80 |
| 10% | 370 | 0.20 | 100 | 73 | 100 | 73 |
| 0 | 480 | 0.14 | 22 | 100 | 7 | 7 |
| 1% | 480 | 0.21 | 75 | 100 | 28 | 28 |
| 10% | 470 | 0.17 | 80 | 100 | 36 | 36 |

It will be seen that, in the case of the copper on activated carbon catalyst, optimum results are obtained with copper concentrations between about 4 and 6 weight percent on the carbon base.

EXAMPLE IV

The effects of temperature and space velocity were determined when converting 2,5-dimethyl tetrahydrofuran to hexanone-2 over a 5% copper on activated carbon catalyst prepared as described in Example III. The data are given in Table III.

These data show that with a 5% copper on activated carbon catalyst, optimum yields of hexanone-2 are obtained at a temperature of 400–430° C. and a space velocity of 0.2–0.4 v./v./hr. At any given temperature, increasing the space velocity reduces the conversion and therefore the ketone yield. At a given space velocity, increasing the temperature from 315 to 430° C. increases the conversion and the yield of ketone. Further increases in temperature result in degradation of the feed and product ketone.

EXAMPLE V 2-methyl tetrahydrofuran was converted to pentanone-2 by passing it over the 5% copper on activated carbon catalyst described in Example III. At a space velocity of 0.27 v./v./hr. and a temperature of 430° C., a 24% conversion and 100% selectivity to pentanone-2 was obtained. Temperatures between about 420 to 500° C. are advisable with an epoxide of this structure. The data follow:

Table III.—*Isomerization of 2,5-dimethyl tetrahydrofuran to hexanone-2*

[(Effect of space velocity and temperature.) Catalyst: 5% copper on activated carbon.]

| Temp., ° C. | Space Velocity, v./v./hr. | Liquid Product, Vol. Percent | Conversion, Percent | Selectivity to Hexanone-2, Percent | Ketone Yield, Percent on Feed |
|---|---|---|---|---|---|
| 315 | 0.22 | 100 | 21 | 100 | 21 |
| 315 | 0.40 | 100 | 3 | 100 | 3 |
| 315 | 0.68 | 100 | 2 | 100 | 2 |
| 315 | 0.98 | 100 | 2 | 100 | 2 |
| 370 | 0.40 | 100 | 27 | 100 | 27 |
| 370 | 0.64 | 100 | 20 | 100 | 20 |
| 370 | 1.20 | 100 | 16 | 100 | 16 |
| 400 | 0.24 | 89 | 96 | 83 | 80 |
| 430 | 0.40 | 100 | 91 | 85 | 77 |
| 430 | 0.72 | 100 | 67 | 55 | 37 |
| 430 | 1.20 | 100 | 70 | 62 | 43 |

| Temp., °C. | Space Velocity, v./v./Hr. | Liquid Product, Vol. Percent | Conversion, Percent [1] |
|---|---|---|---|
| 315 | 0.27 | 100 | 2 |
| 370 | 0.26 | 100 | 12 |
| 425 | 0.27 | 100 | 24 |

[1] Selectivity to ketone was 100% in all cases.

EXAMPLE VI

C5–C7 epoxides of alternate structure were also converted to ketones. Here a 20% platinum on activated carbon catalyst was employed although the other catalysts of this invention would be equally effective. This platinum catalyst was prepared as follows.

50 grams of the 8–14 mesh activated carbon were impregnated with 45 ml. of a solution containing 25 grams chloroplatinic acid (H2PtCl6). The catalyst was dried 16 hours at room temperature and then 16 hours at 120° C. The dried catalyst was reduced with gaseous hydrogen at 400–450° C. until hydrogen chloride was no longer evolved.

The conversion data are recorded in Table IV.

It is apparent that the process of this invention can be employed to prepare ketones from a wide variety of C5 and higher epoxides.

EXAMPLE VII

An attempt was made to convert C3 and C4 epoxides to ketones over the 5% copper on activated carbon catalysts. However, as shown in Table V, epoxides of this molecular weight do not form ketones. Instead, aldehydes are produced as the major products over a wide range of temperatures.

Table IV.—Isomerization of other C₅-C₇ epoxides

[Catalyst: 20% platinum on activated carbon.]

| Epoxide | Temp., °C. | Space Velocity, v./v./hr. | Liquid Product, Vol. Percent | Conversion, Percent | Product | Selectivity to Ketone, Percent | Ketone Yield, Percent on Feed |
|---|---|---|---|---|---|---|---|
| 2,4-Epoxyheptane | 400 | 0.18 | 67 | 100 | Heptanone-2 / Heptanone-4 | 67 | 67 |
| 2-Methyl tetrahydrofuran | 480 | 0.34 | 45 | 59 | Pentanone-2 | 24 | 14 |
| 2-Methyl-5-ethyl tetrahydrofuran | 425 | 0.24 | 100 | 61 | Heptanone-2 | 61 | 37 |
|  | 480 | 0.20 | 67 | 100 | do | 64 | 64 |
| 1,2-Epoxy cyclohexane | 300 | 0.15 | 20 | 100 | Cyclohexanone | 5 | 5 |

Table V.—Isomerization of C₃ and C₄ epoxides

[Catalyst: 5% Copper on activated carbon.]

| Epoxide | Temp., °C. | Space Velocity, v./v./hr. | Liquid Product, Vol. Percent | Conversion, Percent | Product | Selectivity, Percent | Yield, Percent on Feed |
|---|---|---|---|---|---|---|---|
| Tetrahydrofuran | 370 | 0.21 | 100 | 0 | | | |
|  | 425 | 0.26 | 92 | 4 | n-butyraldehyde | 94 | 4 |
|  | 480 | 0.20 | 50 | 56 | do | 12 | 7 |
| Butylene oxide (1,2-epoxybutane) | 205 | 0.21 | 100 | Trace | do | | |
|  | 260 | 0.25 | 80 | 43 | do | 54 | 23 |
|  | 315 | 0.20 | 70 | 100 | do | 62 | 62 |
| Propylene oxide | 175 | 0.23 | 100 | 0 | | | |
|  | 260 | 0.20 | 57 | 100 | Propionaldehyde / Acetone / Allyl alcohol | 51 / 23 / 4 | 51 / 23 / 4 |
| Do | 370 | 0.24 | 55 | 100 | Propionaldehyde / Acetone / Allyl alcohol | 53 / 16 / 7 | 53 / 16 / 7 |

Having described the general nature and several illustrative embodiments of the invention, its scope is particularly pointed out in the appended claims.

We claim:

1. A catalytic ketone synthesis process which comprises contacting a member of the group consisting of 2,3-epoxybutane and saturated epoxides of 5 to 16 carbon atoms having the epoxide oxygen joined to at least one secondary carbon atom at an isomerization temperature of about 200 to 500° C. with a catalyst which contains a metal selected from groups I-B and VIII of the periodic table supported on an activated carbon base.

2. A process according to claim 1 wherein the epoxide has a total of 5 to 10 carbon atoms and contains a polymethylene oxide nucleus of 4 to 5 carbon atoms bearing one to six alkyl substituents of 1 to 4 carbon atoms attached thereto.

3. A process according to claim 1 wherein the epoxide contains a polymethylene oxide nucleus of 2 to 5 carbon atoms and alkylene bridge of 2 to 4 carbon atoms attached to two nuclear carbon atoms at least one of which is adjacent to the nuclear oxygen.

4. A process according to claim 3 wherein the epoxide is an epoxycyclohexane.

5. A process according to claim 1 wherein the epoxide is an epoxyalkane of 5 to 7 carbon atoms containing an epoxide nucleus of 2 to 4 carbon atoms in which the oxygen is joined to secondary carbon atoms.

6. A process according to claim 1 wherein the epoxide is 2,5-dimethyltetrahydrofuran.

7. A process according to claim 1 wherein the epoxide is 2,3-epoxybutane.

8. A process according to claim 1 wherein the catalyst contains 2 to 6% of metallic copper on activated carbon.

9. A process according to claim 1 wherein the catalyst contains metallic platinum.

10. A process according to claim 1 wherein the catalyst contains palladium.

11. A process according to claim 1 wherein the catalyst contains nickel.

12. A process according to claim 1 wherein the catalyst contains cobalt.

13. A process for making hexanone-2 which comprises passing 2,5-dimethyl tetrahydrofuran at a space velocity of about 0.1 to 1.2 volumes of liquid feed per volume of catalyst per hour over a catalyst containing 2 to 6% copper on activated carbon at a temperature of about 300 to 430° C. and at substantially atmospheric pressure, whereby hexanone-2 is obtained as the major reaction product.

14. A process for making a ketone from an epoxide of the group consisting of 2,3-epoxybutane and higher epoxides having the formula

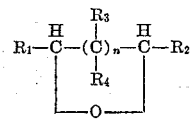

wherein the number of carbon atoms totals from 5 to 16; $R_1$ is an alkyl group of 1 to 4 carbon atoms; $R_2$ is selected from the group consisting of hydrogen and alkyl groups of 1 to 4 carbon atoms; $R_3$ and $R_4$ are selected from the group consisting of hydrogen and alkyl groups of 1 to 4 carbon atoms; and $n$ is an integer ranging from 0 to 3; which comprises passing said epoxide over a catalyst which contains a metal selected from the group consisting of copper, platinum, palladium, nickel and cobalt at an isomerization temperature between 300° and 430° C. such that the major reaction product is the corresponding ketone, the metal catalyst being supported on an activated carbon base having a surface area of about 100 to 1500 m.²/g.

References Cited in the file of this patent

UNITED STATES PATENTS

| | | |
|---|---|---|
| 1,906,833 | Baur | May 2, 1933 |
| 2,465,988 | Jones | Apr. 5, 1949 |
| 2,537,813 | Bremner et al. | Jan. 9, 1951 |